(12) United States Patent
Kennedy

(10) Patent No.: US 6,694,890 B2
(45) Date of Patent: Feb. 24, 2004

(54) METHOD AND APPARATUS FOR PROVIDING A BETWEEN CAR BARRIER FOR TRANSPORTATION VEHICLES

(75) Inventor: George R. Kennedy, Arcadia, CA (US)

(73) Assignee: Los Angeles County Metropolitan Transportation Authority, Los Angeles, CA (US)

( * ) Notice: Subject to any disclaimer, the term of this patent is extended or adjusted under 35 U.S.C. 154(b) by 0 days.

(21) Appl. No.: 09/808,519

(22) Filed: Mar. 14, 2001

(65) Prior Publication Data

US 2002/0129733 A1 Sep. 19, 2002

(51) Int. Cl.[7] .............................................. B61D 33/00
(52) U.S. Cl. ............................ 105/439; 105/3; 105/8.1; 105/21
(58) Field of Search ........................... 105/1.4, 3, 5, 6, 105/8.1, 10, 15, 17, 20, 21, 1.3, 1.1, 439; 296/180.1, 180.2, 180.4

(56) References Cited

U.S. PATENT DOCUMENTS

| | | |
|---|---|---|
| 251,189 A | 12/1881 | Conover |
| 269,839 A | 1/1883 | Du Bois |
| 709,145 A | 9/1902 | Eisenmann |
| 1,142,264 A | 6/1915 | Menden |
| 1,423,303 A | 7/1922 | Brooks |
| 1,431,707 A | 10/1922 | Tatum |
| 1,475,077 A | 11/1923 | Mangin |
| 1,668,556 A * | 5/1928 | Glaenzeret et al. .......... 105/1.1 |
| 1,943,370 A * | 1/1934 | Cornet ........................ 105/15 |
| 2,056,227 A | 10/1936 | Mussey et al. |
| 2,081,964 A | 6/1937 | Tomlinson |
| 2,101,793 A * | 12/1937 | Field .......................... 105/1.3 |
| 2,124,264 A | 7/1938 | Simonson |
| 2,188,632 A | 1/1940 | Ragsdale |
| 2,195,247 A | 3/1940 | Hendrickson |
| 2,269,685 A | 1/1942 | Potthoff |
| 2,468,590 A | 4/1949 | Dean |
| 2,584,904 A | 2/1952 | Monger |
| 2,793,597 A | 5/1957 | Walters |
| 3,387,568 A | 6/1968 | Hawes |
| 3,410,226 A * | 11/1968 | Krupp ......................... 105/10 |
| 3,425,740 A * | 2/1969 | Vaughn ...................... 296/163 |
| 3,532,063 A | 10/1970 | Rowe |
| 3,884,155 A | 5/1975 | Maroshick |
| 3,922,971 A | 12/1975 | Maroshick |
| 4,252,065 A * | 2/1981 | Bickel et al. ................. 105/10 |
| 4,411,201 A | 10/1983 | Hassel et al. |
| 4,433,865 A * | 2/1984 | Crompton, Jr. ............. 296/181 |
| 4,518,188 A | 5/1985 | Witten |
| 4,539,912 A * | 9/1985 | Hassel et al. ................. 105/15 |
| 4,644,872 A | 2/1987 | Vianello et al. |
| 4,746,160 A * | 5/1988 | Wiesemeyer ............. 296/180.2 |
| 5,060,577 A | 10/1991 | Steinmetz |
| 5,560,301 A | 10/1996 | Smith et al. |
| 5,562,042 A | 10/1996 | Luck et al. |
| 5,658,038 A * | 8/1997 | Griffin ..................... 296/180.2 |
| 5,884,565 A * | 3/1999 | Koch .......................... 105/20 |
| 6,257,654 B1 * | 7/2001 | Boivin et al. ............. 296/180.5 |

* cited by examiner

*Primary Examiner*—Mark T. Le
(74) *Attorney, Agent, or Firm*—Bingham, McCutchen LLP

(57) ABSTRACT

A method and apparatus for a Between Car Barrier for multi-car transportation vehicles which utilize a combination of a flexible member and a secured mount, each of which are attached at opposed ends of adjacent cars of a vehicle in substantial alignment with another where the longitudinal axis of each car is substantially aligned. A positioning member keeps the flexible member from extending beyond the edge of the car, even when the vehicle is turning or traversing a curve. This provides a barrier to deter passengers from inadvertently and/or accidentally walking between cars of the multi-car transportation vehicle, thereby reducing the risk of injury.

14 Claims, 3 Drawing Sheets

US 6,694,890 B2

METHOD AND APPARATUS FOR PROVIDING A BETWEEN CAR BARRIER FOR TRANSPORTATION VEHICLES

BACKGROUND OF THE INVENTION

1. Field of Invention

The present invention relates to an apparatus and a method for enhancing the safety of multi-car transportation vehicles. The present invention creates a barrier to prevent, deter and warn passengers, onlookers, workers and others in the vicinity of the vehicle (especially the vision impaired) from inadvertently and/or accidentally entering the space between the cars of a multi-car vehicle while the vehicle is at rest, thereby reducing the risk of injury.

2. Description of the Prior Art

In order to provide efficient and affordable public transportation, it is necessary for transportation service providers to utilize transportation vehicles which have multiple compartments or cars interconnected under a common power source. Examples of such vehicles include multiple compartment or light rail systems, trains, subways, trolleys, monorails and buses.

When multiple cars are employed, there is an inherent risk of injury to passengers, onlookers and others in the vicinity of the vehicle who, for whatever reason, find themselves between the cars when the vehicle resumes movement. Injuries can result from a person falling onto the tracks in the space between adjacent cars. These problems are particularly acute in the situation where passengers or others board or disembark from a multi-car vehicle which is at rest at a raised platform. In such cases, the danger of falling off the platform in the space between the cars which could cause striking or the possibility of becoming entangled in the coupling mechanism, and result in serious injuries or death. Indeed, these risks exist regardless of whether the multi-car vehicle transports passengers, cargo, or both, and the present invention has equal applicability to each.

The need for a barrier system of the present invention is great. For example, people can be injured due to their inattention during the boarding or disembarking process, or simply while they are in the area of the vehicle, where no barrier is provided between the cars of a multi-car transportation vehicle. Moreover, the need for a barrier system in a system where persons with certain disabilities or handicaps, such as blindness or other sight limiting disabilities, is particularly acute so as to avoid injuries which might occur if they were to accidently fall into the space between the cars of the vehicle.

Indeed, transportation providers are obligated to employ devices or systems and mandated by Federal Law the ADA of 1991 which will prevent, deter and/or warn individuals from inadvertently stepping off a platform between cars by local, state and federal transportation laws. (See e.g., Specifications for Transportation Vehicles, 49 CFR §§38 and 38.85.) Such safety measures must comply with other applicable requirements, as well as changes in the requirements, of such regulations and laws. Thus, there is a need for a device of the present invention which can be installed on existing systems and on new products of any design, as well as for a system which has the flexibility to be adapted to the applicable rules and regulations.

Historically, devices such as manual barriers and gates, chains, alarmed motion detectors, and other guards have been used. Human guards have also been used to warn persons in the vicinity of the vehicle not to enter into the space between the cars of the vehicle in an effort to avoid injury. Such systems have numerous disadvantages which are well-known in the industry including high cost, high maintenance, and the possibility of failure of the system to successfully deter and/or warn of the impending danger.

For example, Conover, U.S. Pat. No. 251,189, discloses a guard to close the space between adjacent railroad cars. This invention is enabled by arms which are spring loaded and jointed. This system presents the possibility of mechanical failure of the joints and/or springs, as well as possible significant maintenance expenses. Further, this invention requires human manipulation. An operator who overlooks or forgets to activate this device renders it useless. Finally, the relatively complex construction of the Conover device renders it costly and difficult to adapt to ever-changing designs of modern vehicles.

Similar problems are found in Du Bois, U.S. Pat. No. 269,839, which discloses a pivoted guard gate for railway cars operated by horizontal manipulation of a draw-bar. Should the human operator fail to activate this system, it will offer no protection whatsoever. A more recent reference, Smith, et al., U.S. Pat. No. 5,560,301, also has shortcomings. Smith, et al., discloses a safety barrier which can be used on a subway or railway train. The safety barrier consists of individual pivoting triangular protrusions which can be retracted into a recess located on the outer wall of each train car. Again, the requirement of human manipulation gives rise to the possibility of human error which could render the device ineffective. Further, the retractable feature needlessly adds expense and the possibility of mechanical failure. Finally, adaptability of this device on existing cars is hampered by the requirement of recesses on the outer car wall.

Another attempt to address the need for a device of the present invention can be found in Rowe, U.S. Pat. No. 3,532,063. This invention discloses a safety barrier positioned between coupled vehicles consisting of cables which remain in constant tension owing to spring loading and pulleys. Here again, however, the cost, the possibility of mechanical failure and the difficulty to adapt the Rowe invention to existing cars are critical limitations which do not adequately address industry needs. Accordingly, the need for a reliable, inexpensive and adaptable between car safety device is not found in the prior art.

Other inventions, such as Simonson, U.S. Pat. No. 2,124,264, Dean, U.S. Pat. No. 2,468,590, Walters, U.S. Pat. No. 2,793,597, Hawes, U.S. Pat. No. 3,387,568, Krupp, U.S. Pat. No. 3,410,226, Maroshick, U.S. Pat. No. 3,922,971, Hassel, et al., U.S. Pat. Nos. 4,411,201 and 5,539,912, and Steinmetz, U.S. Pat. No. 5,060,577, provide enclosures and do not disclose efficient devices or methods to address between car safety. Rather, these references disclose bridging and tunnel structures which are expensive and possibly difficult to install on existing cars.

In view of the foregoing, there is a need for the between-car safety apparatus and method of the present invention that addresses and overcomes the deficiencies in the prior art.

SUMMARY OF THE INVENTION

The present invention discloses a method and apparatus for providing a barrier for use on multiple-car transportation vehicles (a "Between Car Barrier").

It is an object of the present invention to provide a Between Car Barrier which will warn and/or deter persons from unintentionally, accidentally and/or inadvertently entering into the space between the cars of the transportation vehicle. It is also an object of the present invention to provide a Between Car Barrier which is inexpensive to install and maintain and which is useable on existing transportation vehicles without extensive retrofitting being required. It is a further object of the present invention to provide a Between Car Barrier which is light-weight and, depending upon the orientation of the car and the vehicle will minimize any fuel inefficiency caused by the installation and/or deployment of the Between Car Barrier. These and other objects and uses of the present invention will become apparent upon consideration of the Detailed Description that follows.

A preferred embodiment of the apparatus of the present invention comprises two components, which may be integrated into a unitary structure. The first component is a secured mount. The end face of the mount is provided with threaded insert holes for the purpose of attaching supporting the second component—a loop and bracket. In the preferred embodiment, the loop and bracket comprises a replaceable loop and bracket of a fiber, semi-rigid rubber or like material. This loop and bracket is designed to conform to meet a corresponding loop and bracket projecting in the opposite direction from the adjacent car of the vehicle and to flex as required on curves.

Alternatively, the loop and bracket includes an articulated extension, which is arranged as above so as to avoid extending beyond the envelope of the car, for example, when the vehicle is on a curve or making a turn. A positioning bungee cord (optional) is provided to keep the flexible loop and bracket from protruding beyond the outside edge of the track envelope (i.e., the longitudinal edge), particularly when the vehicle is on a curve or making a turn.

When installed on opposing sides of adjacent cars of a multi-car vehicle, the present invention forms a barrier against the passage of a person when the cars are joined together. The material used is chosen for the loop and bracket must meet all applicable safety requirements and have properties which will enable the flexible loop to articulate or flex, but then return to its normal, undeformed state.

The present invention can be better understood by referring to the following Detailed Description, which should be read in conjunction with the accompanying drawings. Although the present invention has been described with reference to specific exemplary embodiments, it will be evident to those skilled in the art that various changes and modifications may be made to these embodiments, and equivalents may be substituted for elements in these embodiments, without departing from the general spirit and scope of the invention as set forth in the claims. In addition, many modifications may be made to adapt a particular element, technique or implementation to the teachings of the present invention without departing from the central scope of the invention. Accordingly, the specification and drawings should be regarded in an illustrative rather than a restrictive sense.

BRIEF DESCRIPTION OF THE DRAWINGS

The accompanying drawings, which are incorporated in and constitute a part of the specification, illustrate presently preferred embodiments of the invention, and together with the preceding general description and the following Detailed Description, explain the principles of the invention.

The present invention is illustrated by way of example and not limitation in the following drawings, in which like references indicate similar elements, and in which.

DETAILED DESCRIPTION OF THE INVENTION

Figure 1:
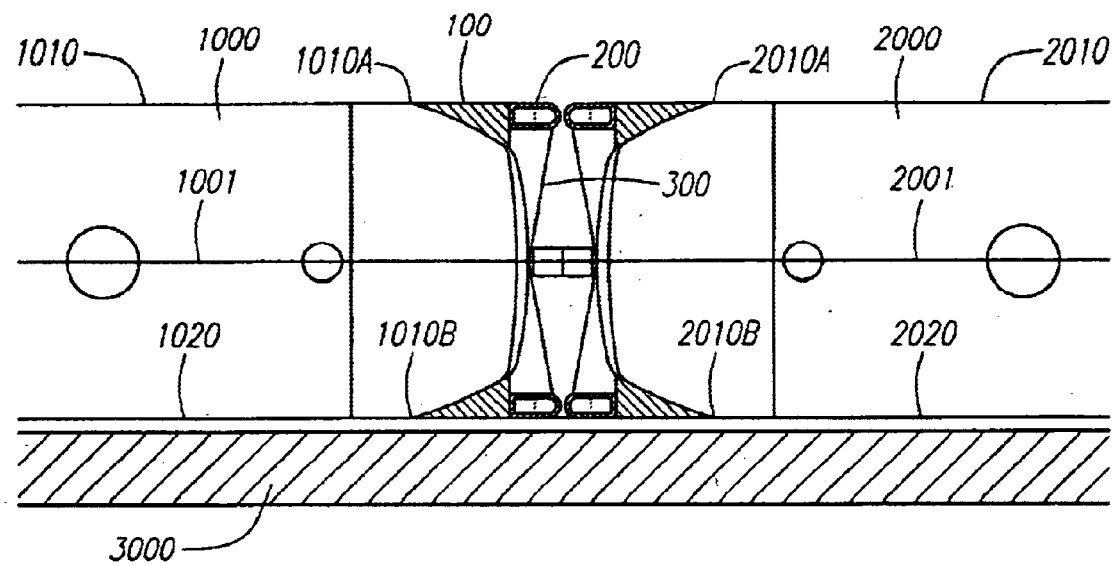
FIG. 1 illustrates a top view of the present invention mounted to two adjoining vehicle cars in an in-line orientation.

FIG. 1 illustrates a top view of a preferred embodiment of the present invention mounted to a multi-car vehicle where the vehicles are substantially in alignment. This is a typical configuration for the loading and unloading of a multi-car transportation vehicle. As indicated in FIG. 1, each of the first and second vehicle cars (1000, 2000 respectively) illustrated has a longitudinal center line (1001, 2001, respectively). Where the cars of the transportation vehicle may be subject to boarding from either or both sides of the longitudinal center line, the device and method of the present invention may be practiced on both of the outer longitudinal edges of the vehicle cars (1010, 1020, and 2010 and 2020, respectively).

Each longitudinal edge has a first end (1010A and 2010A) and second end (1010B and 2010B). Similarly, where the vehicle is configured such that the station platform (3000) will only be adjacent to one longitudinal edge of the vehicle (e.g., 1020, 2020), the device and method of the present invention need only be practiced along that longitudinal edge of the vehicle cars, since that is the side on which the loading and unloading of passengers or material will occur and/or the normally anticipated area where persons might be present which could benefit from the present invention.

Figure 1A:
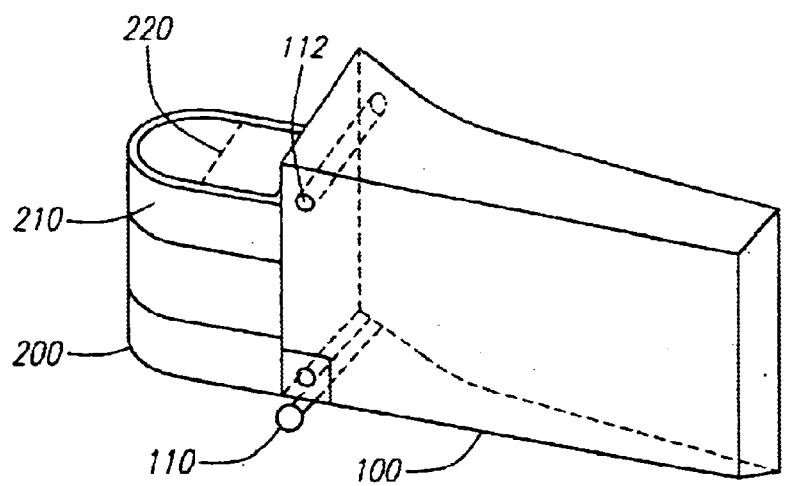
FIG. 1A illustrates a perspective view of the secured mount and flexible loop and bracket of a preferred embodiment of the present invention.

FIG. 1A illustrates a perspective view of an embodiment of the present invention. As illustrated, the present invention comprises two (2) components which are mounted to each car (1000) of a multi-car transportation vehicle. The first component is a secured mount (100). The second component is a flexible loop and bracket (200), such as a semi-rigid rubber loop or an articulating extension (200). In one preferred embodiment, the secured mount (100) is constructed of a light weight composite or aluminum. The secured mount (100) is preferably constructed so as to conform and rest flush with the shape of the vehicle car (1000) where it is mounted. In a preferred embodiment, the secured mount (100) is attached to a vehicle by one or pin connectors (110) inserted through one or more pin openings (112) located on the secured mount (100).

Figure 1B:
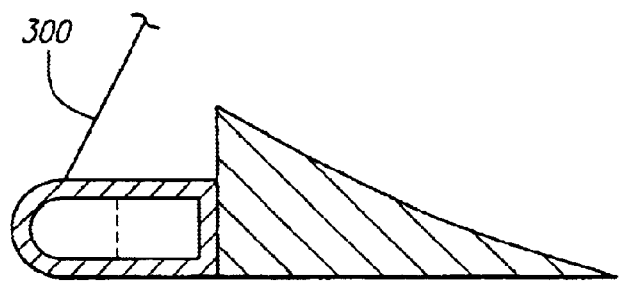
FIG. 1B illustrates a top view of the secured mount and flexible member in the form of a preferred embodiment of the present invention.

The flexible rubber loop and bracket (200) is preferably a replaceable flexible loop constructed of a fiber, rubber or like material in a preferred embodiment. As will be understood by those skilled in the art, this flexible rubber loop and bracket (200) can be an articulating extension which is able to stay within the envelope of the vehicle car (1000) when the car is turning or on a curve and may be unhinged and stored within the barrier bracket. The flexible loop and bracket (200) is preferably attached horizontally to the secured mount (100). The flexible loop and bracket (200) preferably includes at least one reflective strip (210) for added visibility and safety. A stiffener (220) may be inserted into the flexible loop and bracket (200) to add further rigidity. FIG. 1B illustrates a top view of an assembled secured mount (100) and flexible rubber loop and bracket (200). Positioning members (300), such as bungee cords (optional), are connected to the loop.

The physical size of each of the secured mount (100) and the flexible loop (or articulating extension) (200) will depend on various factors including, without limitation, the size of the vehicle cars (1000), the distance by which the cars are separated when they are in a loading and unloading condition and the radius of any turns or curves it will make. FIGS. 1A and 1B set forth typical dimensions applicable to a typical embodiment in which the present invention can be used.

The flexible loop (200) can be removed and stored on a vehicle and can be reattached at anytime. No maintenance to the secured mount (100) or flexible loop (200) is required while the vehicle is in service. Nor is attention needed to the secured mount (100) or flexible loop (200) when the vehicle cars are uncoupled.

Figure 1C:
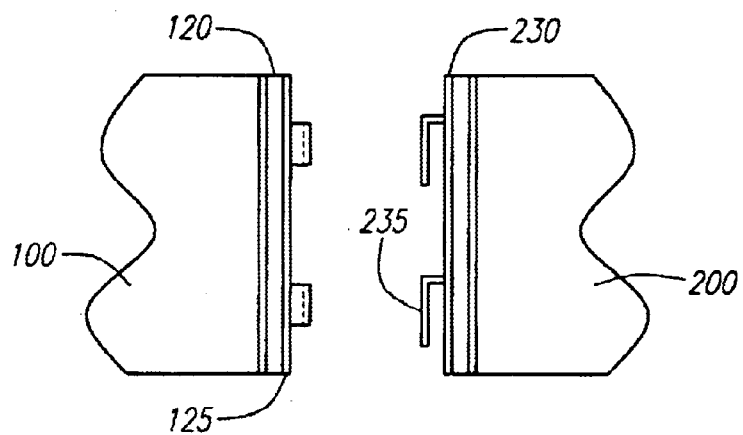
FIG. 1C illustrates a side view of the secured mount and flexible loop and bracket together with an interlocking mechanism.

FIG. 1C depicts a preferred embodiment of the instant invention where an interlocking mechanism is used to connect the secured mount (100) to the flexible rubber loop and bracket (200). Positioned at one end of the secured mount (100) is an end plate (120). The end plate (120) contains at least one slot (125). Positioned at one end of the flexible rubber loop and bracket (200) is a loop end plate (230). The loop end plate (230) contains at least one hook (235). Thus, insertion of the hook (235) on the loop end plate (230) into the slot (125) on the mount end plate (120) interconnects the secured mount (100) to the flexible rubber loop and bracket (200).

Figure 1D:
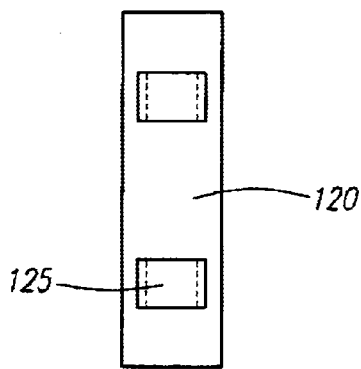
FIG. 1D illustrates a top view of the secured mount face plate of a preferred embodiment of the present invention.
Figure 1E:
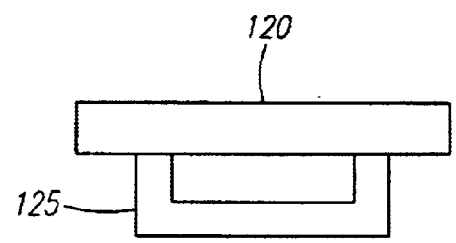
FIG. 1E illustrates a top view of a interlocking slot of a preferred embodiment of the present invention.
Figure 1F:
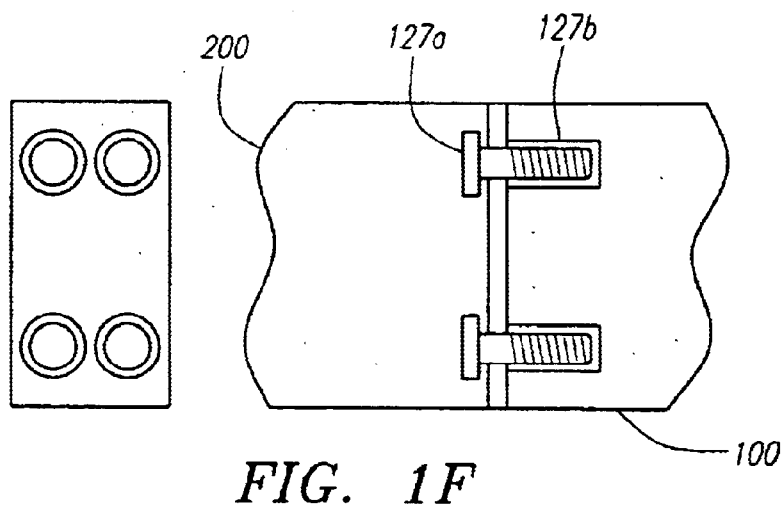
FIG. 1F illustrates an alternative embodiment of the present invention providing the connection of the loop and bracket to a secured mount.

FIG. 1D illustrates a side view of a mount end plate (120) containing two slots (125). FIG. 1E illustrates a top view of a slot (125) located on the mount end plate (120). FIG. 1F illustrates an alternative embodiment of the present invention. In this embodiment, one or more bolts (127a) are threaded between the flexible loop and bracket (200) and the secured mount (100) by virtue of corresponding nuts (127b). As will be understood to one of skill in the art, numerous alternative embodiments of this mechanism could be employed without departing from the spirit of the invention.

As shown in FIG. 1, when the present invention is practiced on the ends of adjacent cars, the flexible rubber loop and bracket (200) of each car meet thereby blocking entrance to the space between the cars. Positioning members (300), such as bungee cords, are optional to keep the flexible loops (200) from protruding beyond the longitudinal edge of the track envelope. FIG. 1 further depicts a preferred embodiment where the positioning member (300) is connected to the flexible rubber loops (200) and is anchored to the vehicle itself. These configurations enable the vehicle to make turns or travel on a curve without endangering persons standing nearby and without interfering with a structure or wall adjacent to the path of the vehicle.

Figure 2:
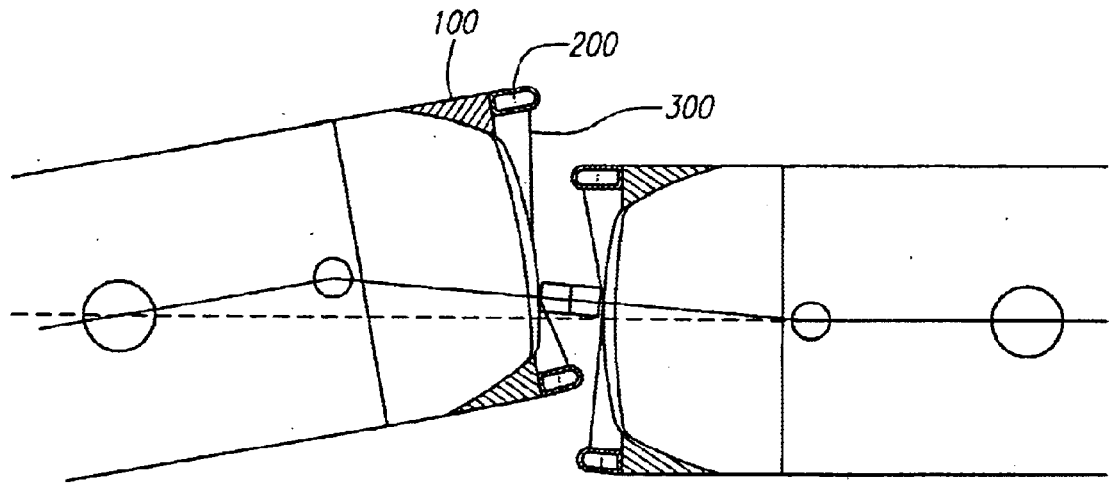
FIG. 2 illustrates a top view of the present invention mounted to two adjoining vehicle cars in a skewed orientation.
Figure 3:
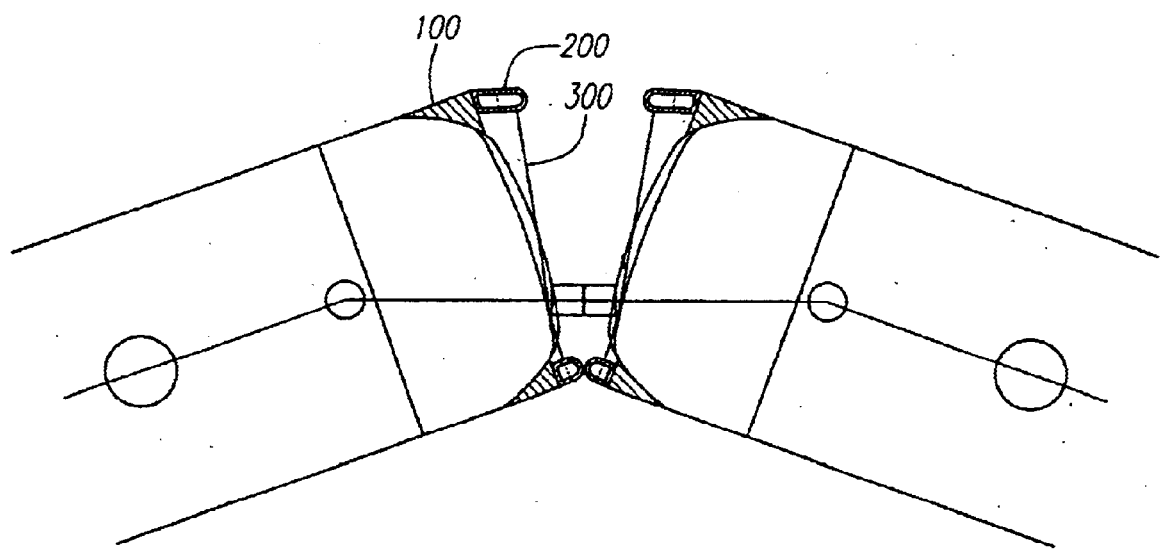
FIG. 3 illustrates a top view of the present invention mounted to two adjoining vehicle cars in a different skewed orientation.

As illustrated in FIGS. 1–3, the Between Car Barrier is mounted on one or more longitudinal edges of adjacent cars in the vehicle such that the Between Car Barrier is attached to the second end of a longitudinal edge (1010B) of a first car (1000) and the first end of a longitudinal edge (2010A) of a second car (2000). The flexible loops (200) act to provide a barrier to prevent persons from entering the area between these vehicle cars. Moreover, when the vehicle turns or traverses a curve (as illustrated in FIGS. 2 and 3), the positioning member (300) connected to each of the flexible members (200) in the above-referenced arrangement will act to ensure that neither of the flexible members extend beyond the envelope or footprint in which the vehicle would move in the absence of the present invention, so as to avoid any collision or interference with any objects or persons in the area of the vehicle.

Given the ease with which the present invention may be installed on a car, it is possible to quickly adapt a car for the configuration with which it may be presented during the course of its travel for particular assignment. Thus, it is possible to easily and quickly adapt a car of a vehicle which historically has had a station platform only along one longitudinal edge of its travels to a train where a station platform may be adjacent to both sides (either simultaneously or different times) of the longitudinal edge of the car.

Thus, a method and apparatus for providing a Between Car Barrier for transportation vehicles is described. Although the present invention has been described with reference to specific exemplary embodiments, it will be evident to those skilled in the art that various changes and modifications may be made to these embodiments, and equivalents may be substituted for elements in these embodiments, without departing from the general spirit and scope of the invention as set forth in the claims. In addition, many modifications may be made to adapt a particular element, technique or implementation to the teachings of the present invention without departing from the central scope of the invention. Accordingly, the specification and drawings should be regarded as illustrative, rather than a restrictive.

I claim:

1. An apparatus for providing a between car barrier for the space between adjacent Transportation Vehicles, where a station platform is used to enter and depart from such vehicles, comprising:

a first mounting apparatus, said first mounting apparatus being arranged so as to connect to the exterior of a first transportation vehicle;

a first flexible member, said first flexible member being detachably connected to said first mounting apparatus;

a second mounting apparatus, said second mounting apparatus being arranged so as to connect to the exterior of a second transportation vehicle;

a second flexible member, said second flexible member being detachably connected to said second mounting apparatus;

said first and said second flexible members, when connected to said first and second mounting apparatus, respectively, form a barrier to prevent entry into the space between the first and second vehicles from the station platform without any cover for the top of the space between the first and second vehicles; and the first and second flexible members being configured to cooperate with each other so as to be deformed and returned to their original shapes during movements of the vehicles around sharp curves.

2. The apparatus in claim 1 further including at least one positioning member, the positioning member being connected to at least one of the first flexible member and the second flexible member, said positioning members being arranged so as to restrict the flexible members to which it is connected from protruding beyond the perimeter of the transportation vehicle to which it is attached.

3. A multi-car vehicle safety apparatus in claim 2 wherein at least one said positioning member is an elastic cord.

4. A multi-vehicle safety apparatus of claim 1 further comprising a stiffener in contact with at least one of said flexible members to provide further stiffness to said flexible member.

5. An apparatus of claim 4 wherein at least one of said flexible members is detachably connected to said secured mount by a hook integral with said flexible member, said hook inserted into a integral with one of said mounting apparatus.

6. A safety barrier for a multi-car transportation vehicle wherein at least one of the cars is arranged for passenger embarkation and disembarkment, the improvement comprising: first and second mounting apparatus, said first and second mounting apparatuses being connected to the exterior of first and second adjacent transportation vehicle cars, first and second flexible members, said first and second flexible members being connected to said first and second mounting apparatuses respectively, said mounting apparatuses and said flexible members being arranged so as to form a barrier to entry into the space between the vehicle cars without any cover for the top of the space between the first and second vehicle cars; and the first and second flexible members being configured to cooperate with each other so as to be deformed and returned to their original shapes during movements of the vehicle cars around sharp curves.

7. A multi-vehicle safety apparatus of claim 6 further comprising a stiffener in contact with at least one of said flexible members to provide further stiffness to said flexible member.

8. An apparatus of claim 7 wherein at least one of said flexible members is detachably connected to said secured mount by a hook integral with said flexible member, said hook inserted into a slot integral with one of said mountings apparatuses.

9. The barrier in claim 6 further including at least one positioning member, said positioning member being arranged as to inhibit at least one of said flexible members from extending beyond the periphery of the vehicle car to which it is attached.

10. A method for providing a safety barrier to retard entry into the space between a first car and a second car of a multi-car transportation vehicle, the method comprising the steps of:

coupling a first secured mount to a first car; coupling a second secured mount to a second car; and, connecting first and second flexible members to said first and said second secured mounts, respectively, said secured mounts and said flexible members being arranged when assembled to form a barrier to restrict entry from the side of said cars into the space between the cars without any cover for the top of the space between the first and second cars; and the first and second flexible members being configured to cooperate with each other so as to be deformed and returned to their original shapes during movements of the cars around sharp curves.

11. The method for providing a safety barrier to retard entry into the space between a first car and a second car of a multi-car transportation vehicle of claim 10 wherein at least one of the flexible members includes a stiffener in contact with said flexible member to provide further stiffness to said flexible member.

12. The method for providing a safety barrier to retard entry into the space between a first car and a second car of a multi-car transportation vehicle of claim 10 wherein at lest one of said flexible members is detachably connected to said secured mount by a hook integral with said flexible member, said hook inserted into a slot integral with one of said secured mounts.

13. In a multi-car transportation vehicle wherein at least one of the cars is arranged for passenger embarkation and disembarkment, the cars having first and second mounting apparatuses attached thereto, the method of providing a safety barrier comprising:

connecting first and second flexible members to said first and second mounting apparatuses, respectively, said mounting apparatuses and said flexible members being arranged when assembled to form a barrier to restrict entry from the side of the cars into the space between the first and second cars without any cover for the space between the first and second cars; and the first and second flexible members being configured to cooperate with each other so as to be deformed and returned to their original shapes during movements of the cars around sharp curves.

14. A multi-car vehicle safety apparatus for use on multi-car passenger vehicles, comprising:

a first mounting apparatus, said first mounting apparatus being arranged so as to connect to the exterior of a first transportation vehicle;

a first flexible member, said first flexible member being hollow and detachably connected to said first mounting apparatus;

a second mounting apparatus, said second mounting apparatus being arranged so as to connect to the exterior of a second transportation vehicle;

a second flexible member, said second flexible member being hollow and detachably connected to said second mounting apparatus;

said first and said second flexible members, when connected to said first and second mounting apparatus, respectively, form a barrier to prevent entry into the space between the first and second vehicles from an entry platform without any cover for the top of the space between the first and second vehicles; and the first and second flexible members being configured to cooperate with each other so as to be deformed and returned to their original shapes during movements of the vehicles around sharp curves.

* * * * *

UNITED STATES PATENT AND TRADEMARK OFFICE
CERTIFICATE OF CORRECTION

PATENT NO. : 6,694,890 B2
DATED : February 24, 2004
INVENTOR(S) : G. Kennedy

It is certified that error appears in the above-identified patent and that said Letters Patent is hereby corrected as shown below:

Column 7,
Lines 8 and 10, delete "A multi-car vehicle safety" and insert -- The --.
Line 14, "An" and insert -- The --.
Line 36, delete "A multi vehicle safety apparatus" and insert -- The safety barrier --.
Line 40, delete "An apparatus" and insert -- The safety barrier --.
Line 45, immediately after "The" insert -- safety --; immediately after "barrier" delete "in" and insert -- of --.

Signed and Sealed this

First Day of June, 2004

JON W. DUDAS
*Acting Director of the United States Patent and Trademark Office*